United States Patent [19]

Dion et al.

[11] Patent Number: 4,741,968

[45] Date of Patent: May 3, 1988

[54] HEAT AND PRESSURE CONSOLIDATED LAMINATE

[75] Inventors: Andrew N. Dion, Auburn; John B. Jalbert, Mechanic Falls, both of Me.

[73] Assignee: Sterling Engineered Products Inc., Maumee, Ohio

[21] Appl. No.: 940,219

[22] Filed: Dec. 8, 1986

Related U.S. Application Data

[63] Continuation of Ser. No. 783,731, Oct. 3, 1985, abandoned.

[51] Int. Cl.⁴ .............................................. B32B 27/36
[52] U.S. Cl. .................................... 428/480; 428/481; 428/482; 428/530; 428/535; 428/537.5
[58] Field of Search ............... 428/480, 481, 482, 530, 428/535, 537.5; 264/500

[56] References Cited

U.S. PATENT DOCUMENTS

| | | | |
|---|---|---|---|
| 2,809,911 | 10/1957 | Richardson | 428/530 |
| 4,370,386 | 1/1983 | Uekita et al. | 428/482 |
| 4,376,812 | 3/1983 | West | 428/211 |
| 4,636,443 | 1/1987 | Jaisle et al. | |

*Primary Examiner*—John E. Kittle
*Assistant Examiner*—P. R. Schwartz
*Attorney, Agent, or Firm*—Marshall & Melhorn

[57] ABSTRACT

A heat and pressure consolidated laminate made with a plurality of core sheets impregnated with an unsaturated polyester treating solution, the polyester providing the laminate with improved flexibility and enabling a core color that matches the color of the decor or face sheet.

15 Claims, No Drawings

HEAT AND PRESSURE CONSOLIDATED LAMINATE

This is a continuation of Ser. No. 783,731 filed Oct. 3, 1985, now abandoned.

The present invention relates to a heat and pressure consolidated decorative laminate having a plurality of core sheets impregnated with a polyester resin.

BACKGROUND OF THE INVENTION

Heat and pressure consolidated decorative laminates are generally produced utilizing a core material comprising a plurality of phenolic resin impregnated kraft paper sheets, a face sheet impregnated with a melamine-formaldehyde resin and optionally a melamine resin impregnated overlay sheet. These high pressure laminates, examples of which are described in the Grosheim et al U.S. Pat. No. 3,418,189, the Casey et al U.S. Pat. No. 4,311,748, and the Jaisle et al U.S. Pat. No. 4,473,613, have found world-wide acceptance as construction materials, i.e., wall panels, countertops, etc. in the home and office. They can be prepared so as to function in a variety of service applications and can be produced with surfaces such as high gloss, a matte finish or an embossed finish.

Recently, decorative laminates having melamine-formaldehyde impregnated core sheets have been proposed in order that the core has a color matching that of the face or decor sheet such that the dark edge line that is perceptible when conventional laminates are cut or worked is eliminated. However, it has been found that this achievement of color match of the core and decor sheet is achieved at the expense of flexibility. In this respect, U.S. Pat. No. 4,448,849 to Keeling et al shows the use of a melamine-formaldehyde resin containing a hydroxylmelamine for impregnating core sheets and/or the decor sheet and/or the overlay sheet to provide a laminate with a solid color edge matching that of the core surface, the laminate being post-formable but not as flexible as desired.

OBJECTS OF THE INVENTION

It is an object of the present invention to provide a heat and pressure consolidated decorative laminate that has increased flexibility and a core color that matches the decor sheet.

It is another object of the present invention to provide a more flexible high pressure decorative laminate comprising a thermosetting melamine/formaldehyde reaction product impregnated face sheet and a core made from a plurality of core sheets impregnated with an unsaturated polyester having an acid number no greater than about 90 for providing flexibility to the consolidated laminate as well as enabling the core to possess a close color match for the face sheet and/or the back sheet of the laminate.

These and other objects will be apparent from the specification that follows and the appended claims.

SUMMARY OF THE INVENTION

The present invention provides a high pressure decorative laminate comprising (a) a thermosetting melamine/formaldehyde reaction product impregnated face sheet; (b) one or more core sheets impregnated with a composition comprising an unsaturated polyester having an acid number no greater than about 90 for providing flexibility to the laminate; and (c) an optional melamine/formaldehyde reaction product impregnated back sheet; the face sheet (a), the core sheets (b) and the optional back sheet (c) being consolidated by heat and pressure to provide a laminate having improved flexibility as well as being resistant to chipping, being easily fabricated and having a color in the core sheets that matches that of the face and back sheets.

The present invention preferably provides a heat and pressure consolidated laminate comprising (a) a thermosetting melamine/formaldehyde reaction product impregnated face sheet; (b) two or more colored core sheets, each core sheet impregnated with a solution comprising an unsaturated polyester having an acid number no greater than about 90, and a catalyst for further polymerizing and thermosetting of the polyester, the impregnated core sheet treated to obtain about 20 to 70 weight percent resin and the impregnated core sheet dried to a volatile content of about 1 to 5 weight percent, and (c) an optional thermosetting melamine/formaldehyde reaction product impregnated back sheet; the resulting consolidated laminate having improved flexibility as evidenced by a wrap test conducted at ambient or room temperature in which the resulting laminate wraps around a 3 to 5 inch radius compared to a current commercially available laminate with core sheets impregnated with a melamine/formaldehyde reaction product which wraps around a 5 to 6 inch radius.

The present invention also provides, in another embodiment, a heat and pressure consolidated laminate comprising: (a) a polyester resin impregnated face sheet; (b) a plurality of core sheets impregnated with a composition comprising an unsaturated polyester having an acid number no greater than about 90 for providing flexibility to the consolidated laminate and a solvent for the polyester; and (c) an optional melamine/formaldehyde reaction product impregnated back sheet; the face sheet (a), the core sheets (b) and the optional back sheet (c) being consolidated by heat and pressure to provide a laminate having improved flexibility as well as being resistant to chipping, being easily fabricated and having a color in the core sheets that matches that of the face and back sheets.

DETAILS OF THE INVENTION

In general, in accordance with the invention, the core sheets are made by impregnating a cellulosic paper pigmented in color to conform with the color of the face sheet, and the face and back sheets produced by impregnating an alpha cellulose paper optionally containing a pigment or a print, pattern or design. Typically, a paper of about a 60 to about a 160 pound basis weight per 3000 square foot ream is employed for the core sheets while the alpha cellulose sheet used in the face layer generally runs from about 40 to about 120 pound basis weight per 3000 square foot ream. The core sheets may be comprised of any of several saturating grade papers, such as alpha cellulose, bleached kraft or cotton linters paper, which are capable of being colored to a close match to the decor or face sheets.

The unsaturated polyester for the core sheets that provides flexibility to the laminate generally is a reaction product of a polyhydric alcohol, a saturated dicarboxylic acid and an unsaturated dicarboxylic acid. The unsaturated polyester is preferably prepared from propylene glycol, isophthalic acid, and maleic anhydride. As is known the acid component generally is used in about 1.0 to 1.05 moles per mole of glycol.

The unsaturated polyester for use in accordance with the invention does not affect the color of the pigmented core sheets as do the dark brown to black phenolic resins. It is also color stable over substantially longer periods of time than the phenolics.

The unsaturated polyester can also be prepared by reacting propylene glycol, maleic anhydride and reclaimed polyethylene terephthalate (PET) resin from, for instance, carbonated beverage bottles. As is known, a catalyst is used for further polymerization of the polyester in preparing the core sheet impregnate, the catalyst being able to generate free radical polymerization initiators; i.e., organic peroxides, inorganic persulfates, the preferred catalyst being t-butyl perbenzoate. In the treating solution for impregnating the core sheets with the unsaturated polyester, a crosslinking monomer that is a vinyl, acrylic or allylic monomer can be used, such as styrene, methyl methacrylate, and diallylphthalate.

The acid number of the unsaturated polyester is generally no greater than about 90, preferably about 10 or 15 to about 50 or 60 and more preferably about 18 or 20 to about 23 or 25. Excellent results have been obtained with an acid number of about 20, particularly for the polyester prepared from propylene glycol, isophthalic acid and maleic acid, such preferred polyester also having an SPI Gel test at 81° C. of about 4.5 to 6.5 minutes and a Brookfield Viscosity (25° C.) of about 14 to 17 poises (60/40 in styrene).

In general, for the polyester the SPI Gel test runs about 2.5 or 3 minutes up to 7 or 8 minutes and the Brookfield Viscosity runs about 10 or 11 poises up to 20 or 25 poises.

In general, the reacting composition for impregnating each of the core layers contains about 30 to 60 parts by weight of the polyester, about 30 to 60 parts by weight of acetone or other solvent for the polyester, about 1 or 2 up to 8 or 10 percent by weight of t-butyl perbenzoate or another catalyst for further polymerization of the polyester and, optionally about 1 to 70 percent by weight of a crosslinking monomer such as styrene. Preferably, the treating solution is about equal parts by weight of acetone and polyester, about 4 weight percent of t-butyl perbenzoate based on the weight of the polyester, and when used, about 5 to 15 percent by weight of the crosslinking monomer based on the weight of the polyester.

The unsaturated polyester impregnated core sheets provides the resultant consolidated laminate with greatly improved flexibility, the laminate being flexible enough at ambient temperature to wrap around a 3 to 5 inch radius without breaking compared to a laminate with melamine/formaldehyde impregnated core sheets that can wrap only around a 5 to 6 inch radius.

The polyester treating composition generally is a solution of about 20 to 80 percent by weight solids, the preferred amount being about 40 to 60 percent by weight, and the optimum amount being about 45 or 50 percent by weight.

In impregnating the face sheet, as is known in the art, a thermosetting melamine/formaldehyde reaction product is used that is a precondensate prepared from generally about 1.0 to 2.7 moles and preferably about 1.75 to 2.25 moles of formaldehyde per mole of melamine. Optionally, small amounts, e.g., about 1 to 20 weight percent based on the weight of the reaction product, of modifiers can be used, such modifiers including dicyandiamide, ortho-para-toluenesulfonamide, sucrose, and glycols such as diethylene glycol.

As previously indicated, the face sheet can be impregnated by a polyester resin, preferably the same unsaturated polyester resin used in impregnating the core sheets.

In some cases although not preferred, a resin system for impregnating the face sheet or even the core sheets can be used that is a blend of melamine (about 15 to 25 weight percent) and a polyester resin (about 75 to 85 weight percent) as described in the Richardson U.S. Pat. No. 2,809,911. The Richardson patent does not describe a melamine/formaldehyde print face sheet and there are dissimilarities between the Richardson patent structure and the laminate in accordance with the present invention including the nature and structure of the polyester molecule used, the resin content of the core, the treating methods and drying time, the laminating pressures and the laminate construction.

In preparing the multiple resin system decorative laminates of the invention, excellent results have been obtained with about 5 to 9 and preferably 6 or 7 core sheets impregnated with the unsaturated polyester treating solution at a resin content of about 38 to 42 weight percent, and dried at about 180° to 220° F. to a volatile content of generally about 1.5 to 4 percent by weight and preferably about 2 or 3.5 percent by weight.

The resulting laminates are generally about 0.05 to 0.07 inches in thickness, have improved flexibility as well as good color match, and possess the desirable properties of resistance to chipping, punchability, ease of handling and fabrication as well as retaining the normal expectations on stain resistance, scratch resistance, surface wear, etc.

A preferred process for manufacturing a laminate of the present invention comprises stacking the impregnated sheets, after at least partial drying, in the desired number and configuration and placing the stack between stainless steel press plates. An optional texturizing sheet may be used and placed between the face sheet and one of the plates to provide gloss and texture to the face sheet, the texturizing sheet being removed after pressing. Thereafter, a pressure of from about 800 to 1400 psi at temperatures from about 240° F. to 350° F. is exerted on the press plates for periods of from 20 minutes to 90 minutes to effect the cure and thereby provide the high pressure decorative laminate.

The following example is intended to illustrate the invention but not to limit it in any way.

EXAMPLE

A print or face sheet was prepared by treating a roll of pigmented alpha-cellulose decorative paper with a melamine/formaldehyde reaction product, the paper being one with a basis weight of approximately 69 pounds per 3000 FT$^2$. The melamine/formaldehyde reaction product was prepared by reacting 2.0 moles of formaldehyde per mole of melamine and adding 2 percent by weight of dicyandiamide as a modifier.

The web of paper was carried through a resin filled dip pan, over sky rolls for better penetration, and through squeeze rolls to obtain a resin content of 55 percent. The web was dried in a treater oven to a volatile content of 5 percent and the proper sheet lengths were cut from the web.

The unsaturated polyester impregnated core sheet was prepared by treating a roll of pigmented alpha-cellulose decorative paper with a basis weight of 97 pounds per 3000 FT$^2$ in a polyester resin. The resin was prepared by reacting propylene glycol, isophthalic acid and maleic acid to provide a polyester having an acid number of 20. The polyester resin was diluted to a 50 percent solids solution using acetone as the solvent and 4 percent tertiary butyl perbenzoate was added to catalyze the polyester. The unsaturated polyester resin solution was as follows:

Polyester Resin Solution 100 pounds Polyester
100 pounds Acetone
4 pounds Tertiary Butyl Perbenzoate The web of alpha-cellulose paper was carried through the polyester resin filled dip pan and through mayer rods to obtain the desired resin content of 40 percent. The web was dried to a volatile content of 2 percent and cut to a sheet length comparable to the print sheet.

The solid color laminate was constructed as by assembling the component sheets as illustrated below.
1 Texturizing Paper (clay filled alpha-cellulose paper)
1 Melamine Treated Print Sheet (Face Sheet)
6 Polyester Treated Core Sheets
1 Melamine Treated Print Sheet (Back Sheet)

The sheets were consolidated in a hydraulic press under 1200 psi of pressure and at a temperature of 285° F. for a total cure cycle of one (1) hour. After pressing, the texturizing paper was removed and the laminate was trimmed and sanded.

The resultant consolidated laminate met the required NEMA standards. The resultant laminate was resistant to chipping, easily fabricated and had a color in the core sheets that matches the face and back sheets. The laminate was flexible as evidenced by a room temperature wrap test in which the laminate wraps around a 3 to 5 inch radius.

We claim:

1. A high pressure decorative laminate comprising:
   (a) a thermosetting melamine/formaldehyde reaction product impregnated face sheet;
   (b) one or more core sheets impregnated with a core sheet treating composition comprising an unsaturated polyester having an acid number no greater than about 90 for providing flexibility to the consolidated laminate; and
   (c) an optional melamine/formaldehyde reaction product impregnated back sheet; the face sheet (a), the core sheets (b) and the optional back sheet (c) being consolidated by heat and pressure to provide a laminate having improved flexibility as well as being resistant to chipping, being easily fabricated and having a color in the core sheets that closely matches that of the face and back sheets.

2. A laminate as defined in claim 1 in which the core sheets (b) comprise two or more polyester treated sheets.

3. A laminate as defined in claim 1 in which the unsaturated resin is obtained from at least partially reclaimed polyethylene terephthalate, an unsaturated dicarboxylic acid and a polyhydric alcohol.

4. A laminate as defined in claim 1 in which the unsaturated polyester is the reaction product of a polyhydric alcohol, a saturated dicarboxylic acid, and an unsaturated dicarboxylic acid.

5. A laminate as defined in claim 1 in which the unsaturated polyester is prepared from propylene glycol, isophthalic acid, and maleic anhydride.

6. A laminate as defined in claim 1 in which the unsaturated polyester is prepared from polyethylene terephthalate (PET) resin, propylene glycol, and maleic anhydride.

7. A laminate as defined in claim 1 in which the core sheet treating composition includes a catalyst for further polymerization of the unsaturated polyester, said catalyst being effective to generate free radical polymerization initiators.

8. A laminate as defined in claim 1 in which the core sheet treating composition includes a vinyl, acrylic, or allylic crosslinking monomer.

9. A laminate as defined in claim 1 in which the treating composition is a solution of about 20 to 80 percent by weight solids.

10. A laminate as defined in claim 1 in which the unsaturated polyester is prepared from propylene glycol, isophthalic acid, and maleic acid, the polyester having a typical acid number of about 20, an SPI Gel test at 81° C. of about 4.5 to 6.5 minutes, and a Brookfield Viscosity (25° C.) of about 14 to 17 poises (60/40 in styrene).

11. A laminate as defined in claim 1 in which the melamine/formaldehyde reaction product is a precondensate prepared from about 1.0 to 2.7 moles of formaldehyde per mole of melamine, and optionally containing a modifier that is dicyandiamide.

12. A laminate as defined in claim 1 in which the treating composition includes about equal parts by weight of acetone and an unsaturated polyester having an acid number of about 20, the composition also containing t-butyl perbenzoate in an amount of about 4 percent by weight of the polyester, and optionally a crosslinking monomer in an amount of about 1 percent to 70 percent by weight of the polyester.

13. A laminate as defined in claim 1 in which the face sheet, core sheets and optional back sheet are consolidated by exerting thereon a pressure in the range of from about 800 to 1400 psi at temperatures from about 240° F. to 350° F.

14. A high pressure decorative laminate comprising:
   (a) a thermosetting melamine/formaldehyde reaction product impregnated face sheet;
   (b) two or more colored core sheets, each core sheet impregnated with a solution comprising an unsaturated polyester having an acid number no greater than about 90, an organic solvent for the polyester, and a catalyst for further polymerizing and thermosetting of the polyester, the impregnated core sheet treated to obtain about 20 to 70 weight percent resin and the impregnated core sheet dried to a volatile content of about 1 to 5 weight percent; and
   (c) an optional thermosetting melamine/formaldehyde reaction product impregnated back sheet;
the resulting consolidated laminate having improved flexibility as evidenced by a wrap test at room temperature in which the resulting laminate wraps around a 3 to 5 inch radius compared to a laminate with core sheets impregnated with a melamine/formaldehyde reaction product which wraps around 5 to 6 inch radius.

15. A high pressure decorative laminate comprising:
   (a) a polyester resin impregnated face sheet;
   (b) a plurality of core sheets impregnated with a composition comprising an unsaturated polyester having an acid number no greater than about 90 for providing flexibility to the consolidated laminate, and a solvent for the polyester; and (c) an optional melamine/formaldehyde reaction product or polyester impregnated back sheet; the face sheet (a), the core sheets (b) and the optional back sheet (c) being consolidated by exerting thereon a pressure in the range of from about 800 to 1400 psi at temperatures from about 240° F. to about 350° F. to provide a laminate having improved flexibility as well as being resistant to chipping, being easily fabricated and having a color in the core sheets that closely matches that of the face and back sheets.

* * * * *